US007627353B2

(12) United States Patent
Glissman et al.

(10) Patent No.: US 7,627,353 B2
(45) Date of Patent: Dec. 1, 2009

(54) CIRCUIT AND METHOD FOR PROVIDING AN AUTO-OFF CAPABILITY FOR A WIRELESS TRANSMITTER

(75) Inventors: John Glissman, Valley Ford, CA (US); Arthur L. Cohen, Mountain View, CA (US)

(73) Assignee: Aerielle Technologies, Inc., Mountain View, CA (US)

( * ) Notice: Subject to any disclaimer, the term of this patent is extended or adjusted under 35 U.S.C. 154(b) by 453 days.

(21) Appl. No.: 11/680,936

(22) Filed: Mar. 1, 2007

(65) Prior Publication Data

US 2008/0214122 A1    Sep. 4, 2008

(51) Int. Cl.
*H04B 1/38* (2006.01)
*H04B 1/04* (2006.01)

(52) U.S. Cl. .................. 455/574; 455/127.1; 455/127.5

(58) Field of Classification Search ............. 455/127.1, 455/127.5, 572, 574, 575.1, 343.2, 343.5, 455/115.1, 66.1; 340/7.32, 7.36, 539.3, 693.3
See application file for complete search history.

(56) References Cited

U.S. PATENT DOCUMENTS

| | | |
|---|---|---|
| 4,536,808 A | 8/1985 | Fujibayashi |
| 5,025,704 A | 6/1991 | Davis |
| 5,095,308 A | 3/1992 | Hewitt |
| 5,636,077 A | 6/1997 | Kim |
| 5,771,441 A | 6/1998 | Altstatt |
| 6,191,505 B1 | 2/2001 | Matsuyama |
| 6,441,804 B1 | 8/2002 | Hsien |
| RE37,884 E | 10/2002 | Chen |
| 6,529,067 B2 | 3/2003 | Uen et al. |
| 6,671,494 B1 | 12/2003 | James |
| 6,987,947 B2 | 1/2006 | Richenstein et al. |
| 7,210,403 B1* | 5/2007 | Tyndall ....................... 99/427 |
| 7,212,786 B2* | 5/2007 | Kojima et al. .............. 455/41.2 |
| 7,305,259 B1* | 12/2007 | Malone et al. ............. 455/574 |
| 7,418,244 B2* | 8/2008 | Montalvo ................ 455/127.2 |
| 7,434,077 B2* | 10/2008 | Saito et al. .................. 713/340 |
| 7,474,757 B2* | 1/2009 | Cohen et al. ................ 381/120 |
| 2006/0050901 A1 | 3/2006 | Cohen et al. |

* cited by examiner

*Primary Examiner*—Sonny Trinh
(74) *Attorney, Agent, or Firm*—Craig M. Stainbrook; Stainbrook & Strainbrook, LLP

(57) ABSTRACT

A circuit and method for providing an auto-off capability for a wireless transmitter, of a type having an audio plug which mates with the output jack of an audio source. The portable transmitter modulates signals from a baseband signal source onto a carrier and transmits the RF carrier to a receiver. The auto-off capability is provided to prolong battery life and eliminate the transmission of unmodulated RF carriers. The auto-off capability comprises turning power off to the transmitter circuit when baseband input signal is absent for more than a predetermined amount of time, and immediately turning on the transmitter circuit when baseband signal is present.

10 Claims, 14 Drawing Sheets

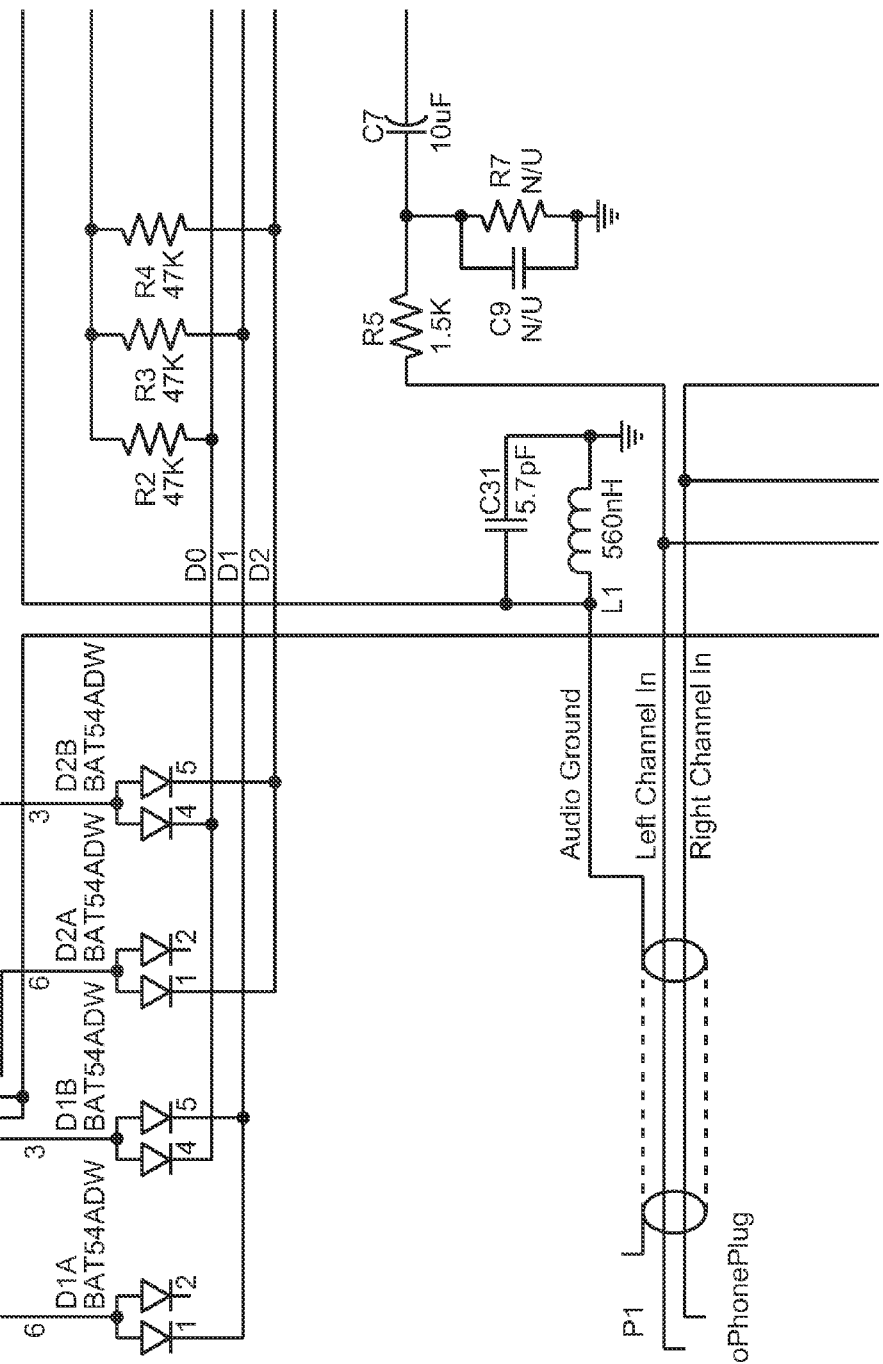

CIRCUIT AND METHOD FOR PROVIDING AN AUTO-OFF CAPABILITY FOR A WIRELESS TRANSMITTER

CROSS REFERENCES TO RELATED APPLICATIONS

The present application claims the benefit of United States Utility Patent Application Ser. No. 10/540,070, filed Jun. 22, 2005 (Jun. 22, 2005), which is a Section 371 filing of International Patent Application Serial Number PCT/US04/00452, filed Jan. 9, 2004 (Jan. 9, 2004), which claims the benefit of U.S. Provisional Patent Application Ser. No. 60/438,905, filed Jan. 9, 2003 (Jan. 9, 2003).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT Disc

Not applicable.

BACKGROUND OF THE INVENTION

1. Field of the Invention

The present invention relates generally to the field of consumer electronics, and, more specifically, to the field of wireless transmitters for use in transmitting a signal from a device such as a CD player, digital audio player, or a car stereo to a remote speaker system, wherein such device has an auto-off capability.

2. Discussion of Related Art Including Information Disclosed Under 37 CFR §§1.97, 1.98:

With the widespread use of portable AM/FM receivers, cassette, CD, MP3 players, as well as other consumer electronic devices outputting audio and/or data signals, a need has arisen for more convenient methods for delivering those signals to the system user. Currently, users typically wear headphones that are coupled to the signal-generating device by wires. These wires are inconvenient and possibly dangerous. In the case of portable audio devices, for instance, the devices may be employed while their users are doing other things such as jogging, rollerblading, manual labor, driving, etc. During such activities, wires are susceptible to being tangled up or otherwise providing a hindrance to efficient use. The same is true of wires leading from stationary devices such as a personal computer, car dashboard, or rack mounted stereo.

Therefore, as signal generating devices have proliferated, so too has the need to make them convenient. One example of a convenient, hands-free environment was disclosed in U.S. Pat. No. 5,771,441 for a Small Battery Operated Rf Transmitter for Portable Audio Devices for Use with Headphones with Rf Receiver, issued Jun. 23, 1998 to John E. Alstatt (hereinafter referred to as "Alstatt").

In Alstatt, there is taught a portable RF transmitter that modulates audio signals from an audio source onto an FM carrier and then transmits such signals to an FM receiver mounted on a headset worn by a user. The RF transmitter uses its own ground circuit and the ground circuit of the audio source as two elements of a short dipole. Products, such as the AUDIOBUG™, available from Aerielle, Inc. of Mountain View, Calif., have successfully embodied such a wireless device.

A further example of a solution to the problem of wireless transmission is found where small RF transmitters have been used on electric guitars to transmit audio signals from the guitar transducer to a receiver coupled to a power amplifier. An example of this type of technology is found in U.S. Pat. No. 5,025,704 for a Cordless Guitar Transmitter, issued Jun. 26, 1991 to Richard L. Davis (hereinafter referred to as "Davis"). In Davis, there is taught an electronic device which, when connected to an electric guitar, or other similar stringed instrument, will effect wireless transmission over a selectable frequency of the FM broadcast band. The unit is compact as it uses the metal strings of the guitar as a partial antenna. The unit remains stationary after being plugged into the guitar's input receptacle, and no transmitting portion of the device has to be attached to the musician's belt or guitar strap, or to the musician's person. Furthermore, no antenna extends from the device itself. The device is automatically turned on when plugged in.

As devices providing wireless transmission capabilities have improved and become more convenient and accessible at the consumer level, there has also grown a need to eliminate the transmission of unmodulated RF carriers, and to become more efficient in prolonging battery life. Without this efficiency, larger and/or more expensive batteries, or multiple batteries coupled together, are required to drive the transmitters. The alternative has been a drastically reduced battery life. Thus, there has evolved a need for circuits that reduce battery consumption.

Several United States patents reflect proposed solutions to this need, including U.S. Pat. No. 5,636,077, to Kim, which discloses a video recording and reproduction device having an automatic power-saving circuit. The circuit determines the existence of an input video signal and controls system functions accordingly. Video recording and reproduction functions continue if an input video signal is present, and, if no video signal exists and no function key is input for a predetermined period of time, the recording/reproducing actions are halted and power is automatically cut-off.

U.S. Pat. No. 6,441,804, to Hsien, teaches a wireless cursor control system that includes a pointing device and a receiver. The pointing device has a controller for receiving user input and for providing a control signal, and a transmitter that includes an antenna and a high frequency modulator coupled to the controller for receiving the control signal and for generating an output signal for transmission via the antenna. The high frequency modulator includes a variable frequency modulator circuit for selectively changing the frequency deviation of the control signal, and a high frequency circuit for increasing the frequency deviation of the control signal to produce the output signal. The receiver has an antenna that receives the output signal, and a demodulation circuit for demodulating the received output signal. The transmitter circuit includes a power saving circuit coupled to the high frequency modulator and controller and detects whether controller has received any input from a button circuit. If no input has been received by the controller for a predetermined time period, the power saving circuit automatically switches the transmitter into a power-saving mode by disconnecting the RF amplifier and the buffer circuit. In the power-saving mode, the button circuit, clock generator, and controller are on, and the remaining circuits are deactivated. User activation of any of the buttons of the button circuit causes the transmitter to come out of the power-saving mode.

U.S. Pat. No. 6,529,067 to Uen shows a power saving device for a wireless pointer including a first resistor, a second capacitor, a signal generation circuit, a bias control circuit including an n-type channel MOSFET having a drain connected to the signal generation circuit at a second node for driving the signal generation circuit, a switch having one end connected to an n-type channel MOSFET gate at a first node, a semiconductor having an anode connected to the first node gate and a cathode connected to the positive terminal of the power source, and a first capacitor in series connection with the semiconductor means. When the wireless pointer is inoperative, the switch opens automatically to cause the leakage current of the reverse biased semiconductor to charge the first capacitor. When the switch is closed, the first capacitor discharges completely and cuts off the n-type channel MOSFET. The charging and discharging decrease current consumption in a standby mode.

U.S. Pat. No. RE37,884 to Chen discloses a transmitter-receiver system including a transmitter unit installed in an audio equipment, and a receiver unit installed in an earphone, wherein the transmitter unit includes an automatic electric level regulator to regulate the electric level of the output signal of audio equipment to a predetermined range, a power control circuit controlled by the output signal of the audio equipment to provide the necessary working voltage, and an inductance antenna to transmit output signal from the audio equipment to the receiver unit. The receiver unit is of low working voltage design, including an automatic 24-time frequency divider circuit to effectively discriminate left and right sound tracks, and an auto-shut off circuit to automatically cut off power supply when the audio equipment does no work. The transmitter unit and the receiver unit further use a respective dual oscillation frequency regulating circuit consisting of an oscillating transistor, a dielectric resonator, and two variable resistors for regulating the range of the frequency.

The foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

It is therefore an object of the present invention to provide a new and improved circuit with a power-saving auto-off capability for an audio device.

A further object or feature of the present invention is a new and improved circuits and methods for providing an auto-off capability for a wireless transmitter.

An even further object of the present invention is to provide a novel circuit having auto-off capabilities for a wireless transmitter that reduces background noise generated by the circuit.

Accordingly, an aspect of the present invention is the reduction of power consumption in an audio device by providing an auto-off circuit that will automatically switch off the system when it is not in use. A further aspect of the present invention is reduction of interference, or background noise generated by the system by providing for the use of certain circuit elements.

Other novel features which are characteristic of the invention, as to organization and method of operation, together with further objects and advantages thereof will be better understood from the following description considered in connection with the accompanying drawings, in which a preferred embodiment of the invention is illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures and elements for the functions specified.

Briefly stated, the present invention is a circuit and method for providing an auto-off capability for a wireless transmitter, of a type having an audio plug extending therefrom which mates with the earphone or output jack of an audio source such as a portable battery operated CD, tape, or MP3 player. The portable radio frequency (RF) transmitter modulates audio signals from the audio source onto an RF receiver. The auto-off capability is provided to prolong battery life and eliminate the transmissions of unmodulated RF carriers and comprises pinching off a first field effect transistor (FET) when the circuit is in an "off" state. This occurs when a pre-determined threshold in a capacitor is reached by not discharging that capacitor. The capacitor is discharged by dropping the output from an audio-sensing comparator whose input drops below a pre-determined threshold limit when presented with an audio peak, and wherein the drop in value causes open drain comparator output to go low, discharging the capacitor and causing the FET to supply power to the regulator. In a practical application of the circuit, the comparator polarity could be turned around, or reversed, such that it was sensing the positive going peaks to discharge the capacitor.

The description herein teaches three basic circuit blocks required to implement the auto-off function: the audio sensing function (comparator), the timing function (a resistor/capacitor time constant), and a switching function (field effect transistor or bipolar transistor). Each of these circuit blocks could be implemented in a variety of ways.

For example, the timing block can be implemented in a very inexpensive way using the RC time-constant described. However, this approach would be limited to a maximum timeout value of 2-3 minutes by required component values, and could vary by 10-20% by component tolerances. Replacing the resistor/capacitor with an embedded controller, microprocessor, or other implementation of a digital counter, these timing limitations can be eliminated.

As another example, the switching function used to turn power to the circuit off is a FET in the preferred embodiment, but could be implemented using a bipolar transistor or other semiconductor device, or by controlling the "shutdown" function available on many integrated voltage regulators.

The audio sensing function can be implemented in a variety of ways as well, depending on audio levels used and power available. Bipolar transistors, FETs, or operational amplifiers could be used to process the audio as input to the timing function. Alternatively, the audio signal itself could be coupled to a digital input (microprocessor input, logic gate, etc.) that is DC biased to very near its switching threshold to detect audio presence.

In addition to the foregoing, several novel features characteristic of the invention, as to the preferred circuit design and the methods of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
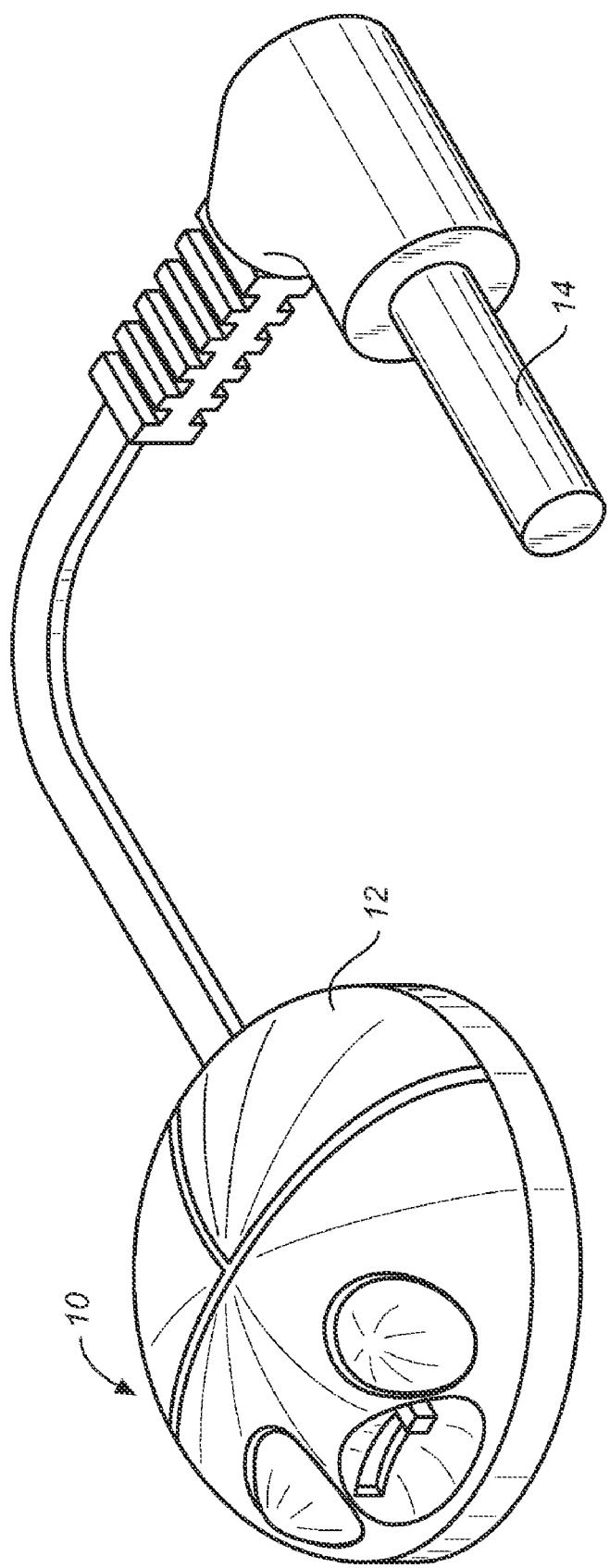
FIG. 1 is a perspective drawing of a supporting structure or device that can utilize the present invention.

Referring first to FIG. 1, there is shown a perspective drawing of the supporting structure or device that can utilize the present invention. A battery operated audio source, typically a portable stereo radio, a portable cassette player or a portable compact disk player, generates audio signals from received radio signals or program material recorded on a medium. These audio signals are presented at a headphone or output jack that in turn is transmitted to the RF transmitter 10.

The portable, battery operated RF transmitter 10, is comprised of a transmitter housing 12 and enclosed integrated circuitry and a male plug 14, which plugs into the headphone or output jack of the audio source. The RF transmitter 10 could alternatively be hardwired to, or embedded in, the device as well. The audio signals generated by the audio source are amplified at the audio transmitter 10 and modulate an RF carrier. The RF carrier is coupled into an antenna for radiation to a remote receiver.

Figure 2B:
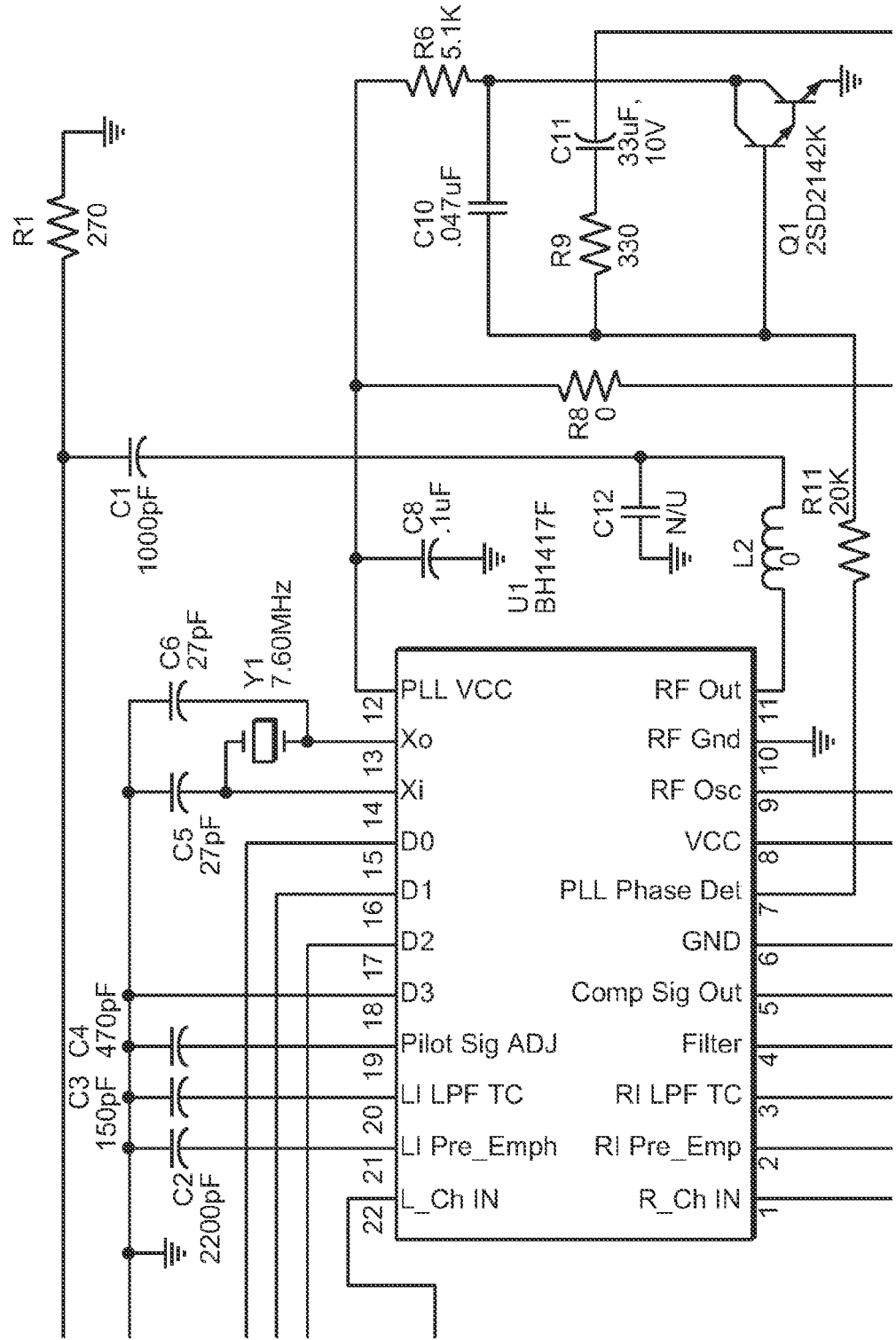
FIG. 2 partitioned into FIGS. 2A-2D for clarity) is a circuit diagram of an audio transmitter of the type capable of utilizing the disclosed auto-off circuit.
Figure 2C:
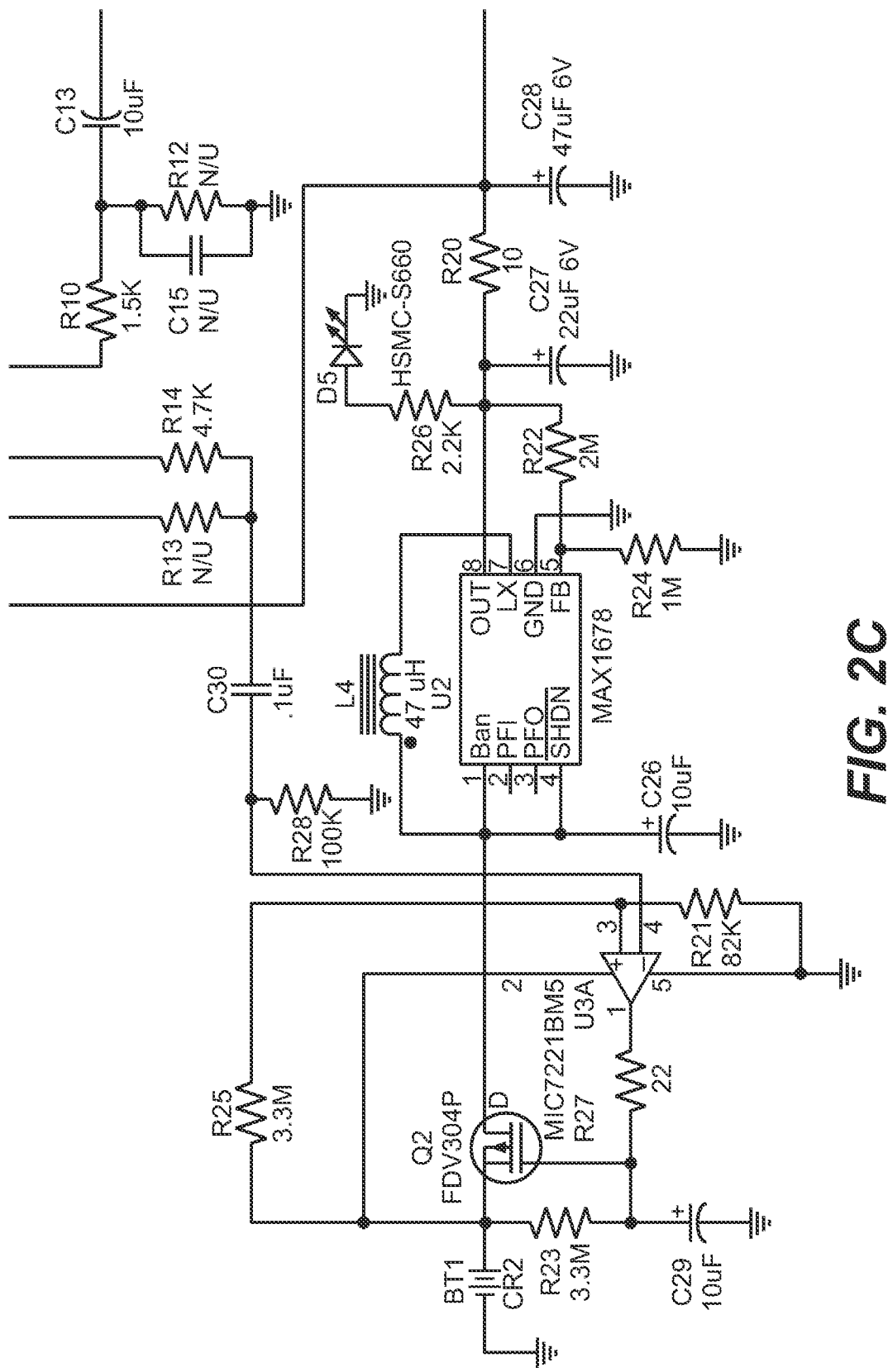
Figure 2D:
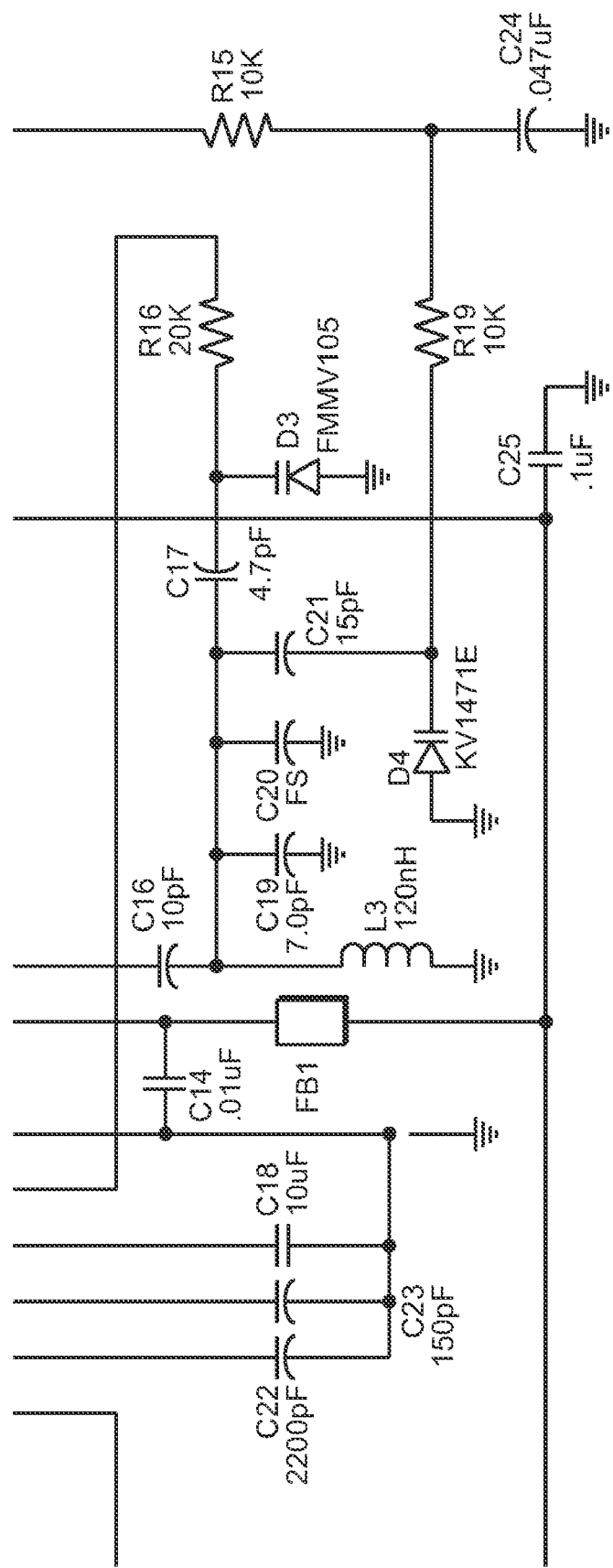

Referring next to FIG. 2 (partitioned into FIGS. 2A-2D for clarity), there is shown a circuit diagram of a transmitter platform capable of utilizing the disclosed auto-off circuit. Audio signals from an external source such as a CD player, cassette tape player, MP3 player, etc., enter the circuit at P1 via a standard 3.5 mm three conductor audio cable and are attenuated, AC coupled, and routed to right audio input pin 1 and left audio input pin 22 (see FIG. 2B). Each channel is routed through a 50 uS pre-emphasis network, a limiter circuit to prevent over-deviation of the transmitter by excessive audio levels, and a 15 kilohertz (KHz) lowpass filter network to remove undesired spectral components outside the audio range. The processed audio signals are then fed to the stereo multiplexer. This circuit does the left-right channel subtraction, modulates a 38 KHz subcarrier provided by the PLL with this signal, and divides the 38 KHz source into two (2) to generate a 19 KHz pilot, then outputs the gain-scaled composite signal on pin 5.

The transmit chain consists of an on-chip phase-locked oscillator with an external AC-coupled tank circuit consisting of L3, C17, C19, C20, C21, and varactor diodes D3 and D4. The oscillator frequency is sampled on-chip and divided by a programmable divider down to approximately 100 KHz, where it is compared with a 200 KHz reference signal derived from a crystal reference oscillator operating at 7.6 MHz. The result of this phase comparison is output from pin 7 to an external loop filter consisting of Q1, C10, C11, C24, R9, and R15, having a bandwidth of about 14 Hz. The DC output of the loop filter is an error voltage proportional to the difference of the divide down oscillator frequency and the divided down reference signal, and is applied to varactor D4, coupled to the oscillator tank circuit by C21, thus controlling the oscillator frequency. Capacitor C20 is selected during manufacture to center the oscillator in the desired range, assuring that frequency lock is maintained over the entire operating voltage and temperature range.

Channel selection is performed by changing the divide ratio of the programmable divider in the oscillator chain. Slide switch SW1, the diode decoding matrix formed by D1 and D2, and the on-chip decoding of signals D0-D3 (pins 15-18) allow the selection of four (4) channels in the range of 88.1 to 107.9 MHz.

The composite stereo baseband signal from pin 5, above, is routed through R16 to varactor diode D3, which is coupled to the oscillator tank circuit by C17. The change in capacitance of this diode caused by the varying composite baseband signal causes small changes in the oscillator frequency, thus frequency modulating the oscillator with the composite signal. Due to the very narrow loop filter bandwidth, the PLL is unable to track out the modulation. A separate varactor diode may be used for the modulation patch to improve modulation linearity from channel to channel, assuring constant deviation over the operating range.

Primary power for the circuit is provided by a CR2 3V lithium battery. As useful power can be obtained from the battery down to about two (2) volts, and circuit operation is degraded below about 2.8 volts, a switching regulator is used to transform the varying battery voltage to 3.75 volts into the regulator filter. This regulator is a PWM type switcher optimized for efficiency, with the switching frequency varying with battery voltage.

Figure 3:
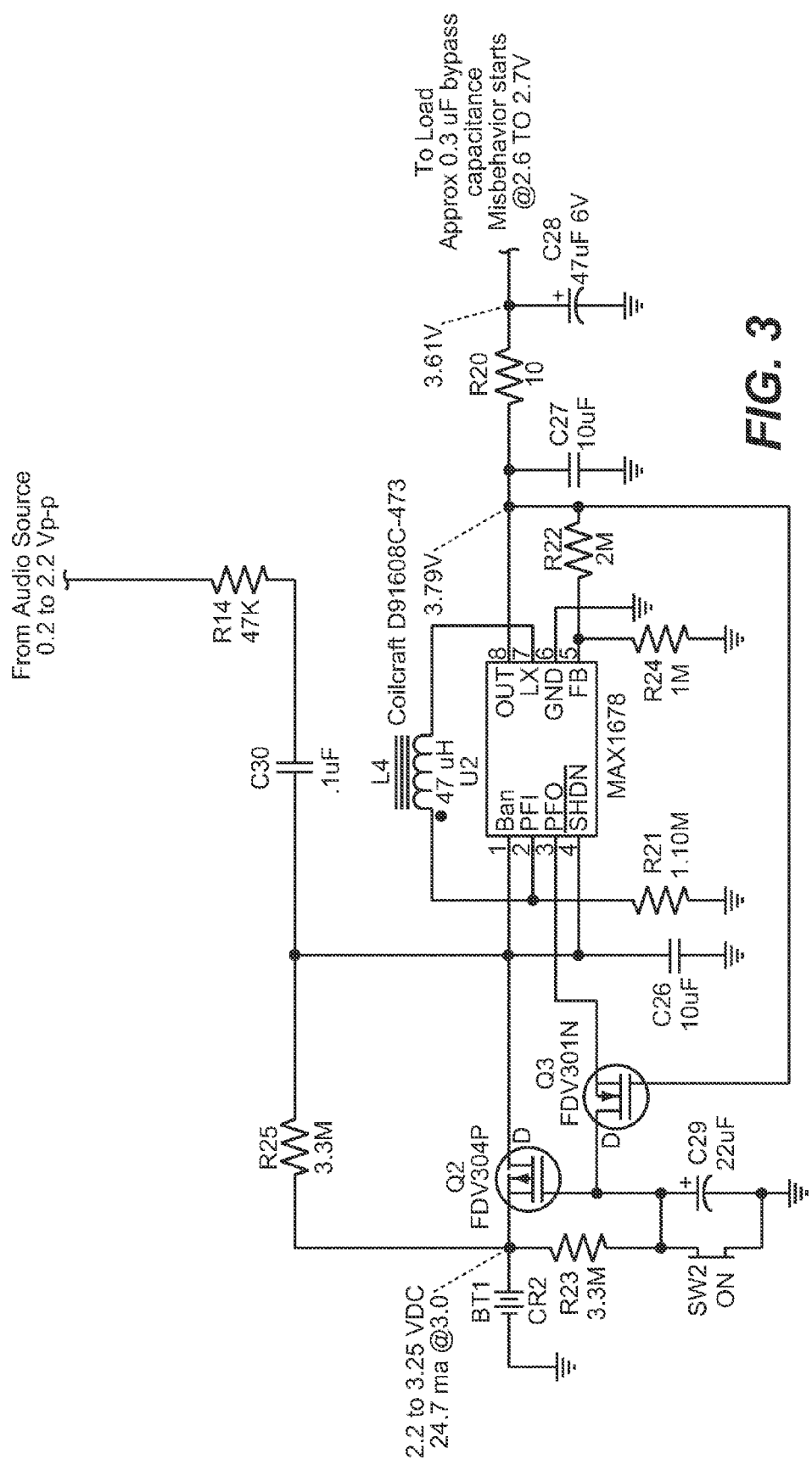
FIG. 3 is a circuit diagram of the disclosed auto-off circuit of this invention.
Figure 4A:
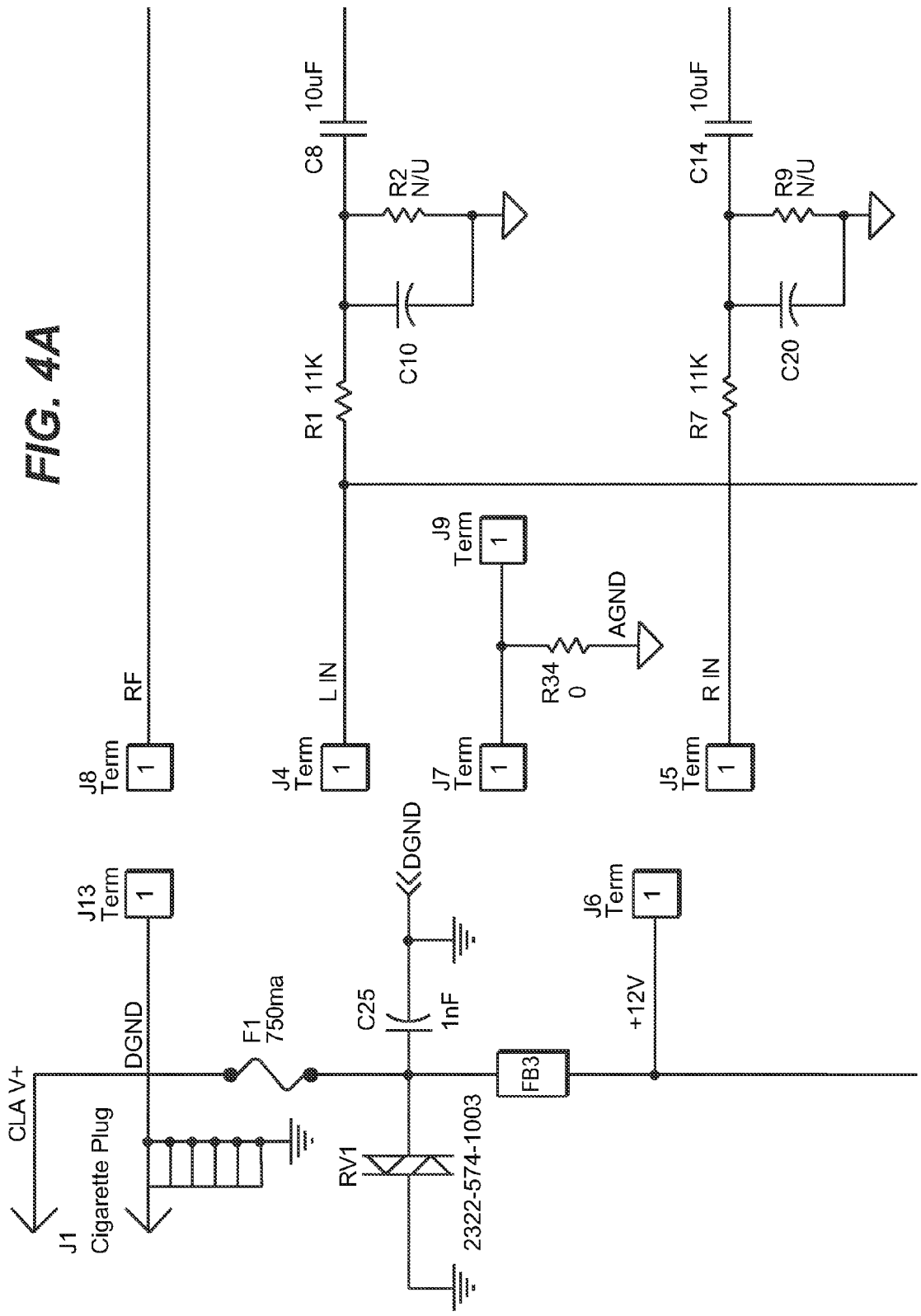
FIG. 4 partitioned into FIGS. 4A-4D) is a circuit diagram of an alternative embodiment of the invention wherein a comparator detects the presence of audio, and wherein an embedded controller detects the output of the comparator, and provides an additional timing function for extending the duration of transmission in the absence of audio in the auto-off circuit.
Figure 4B:
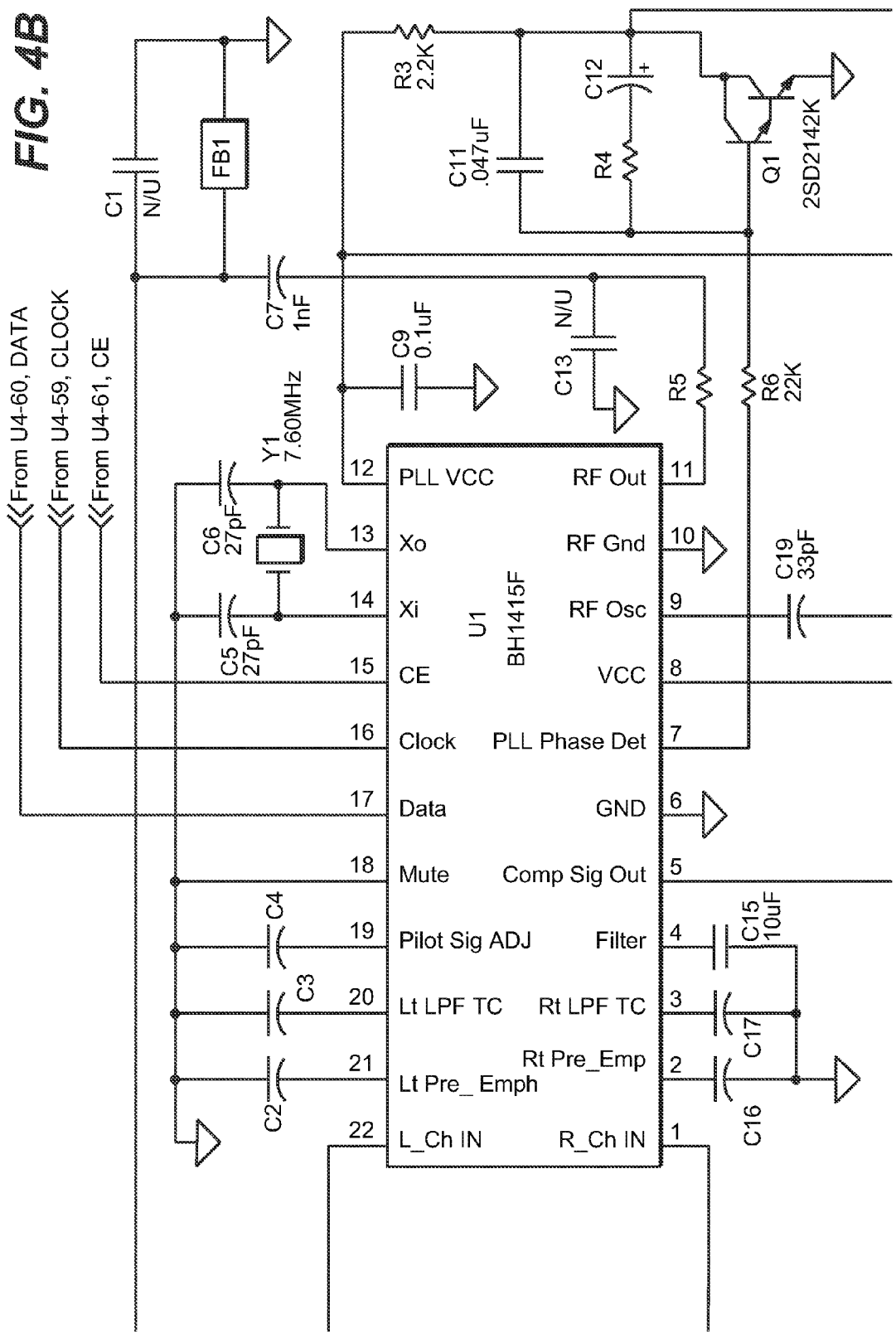
Figure 4C:
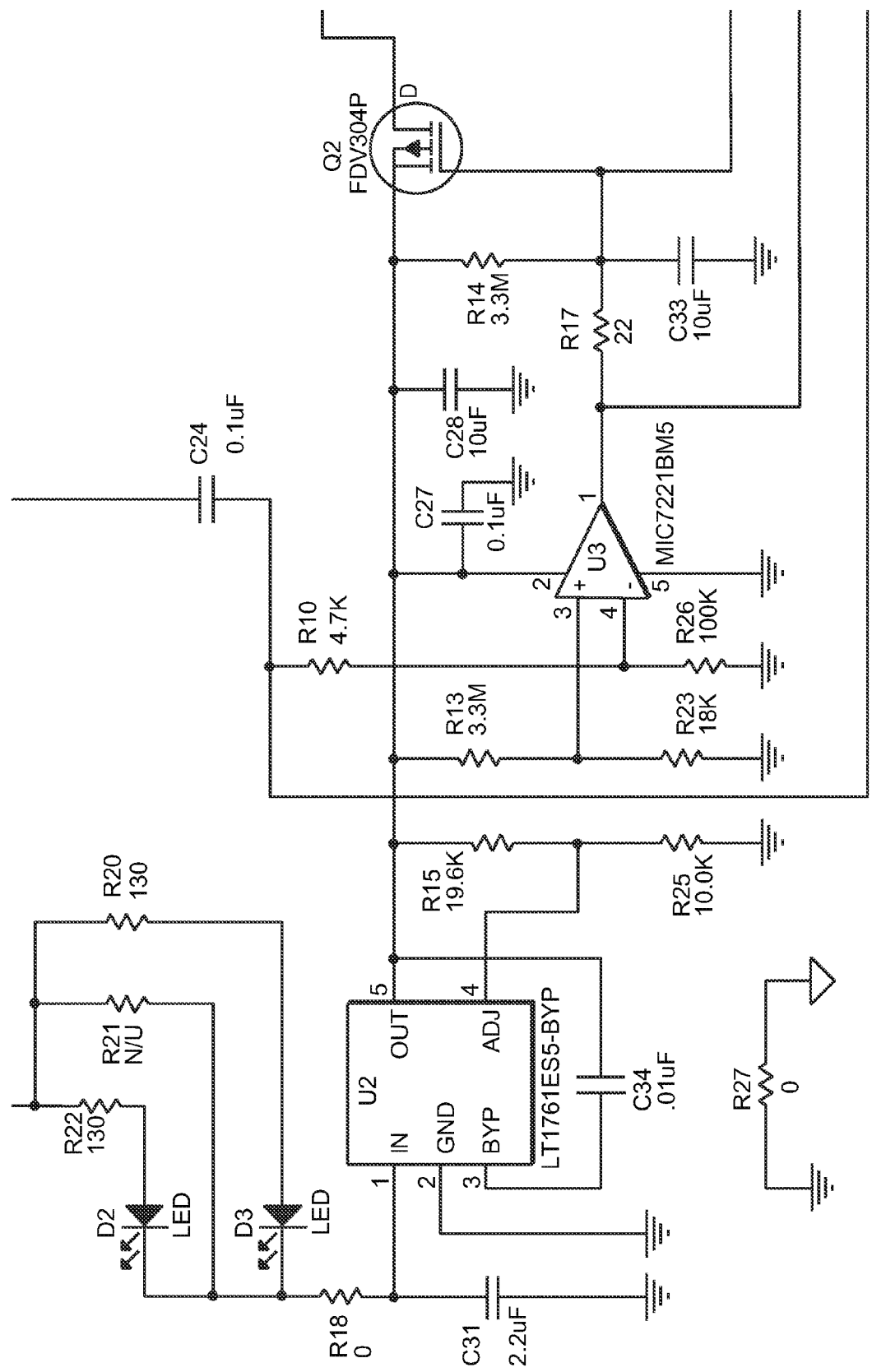
Figure 4D:
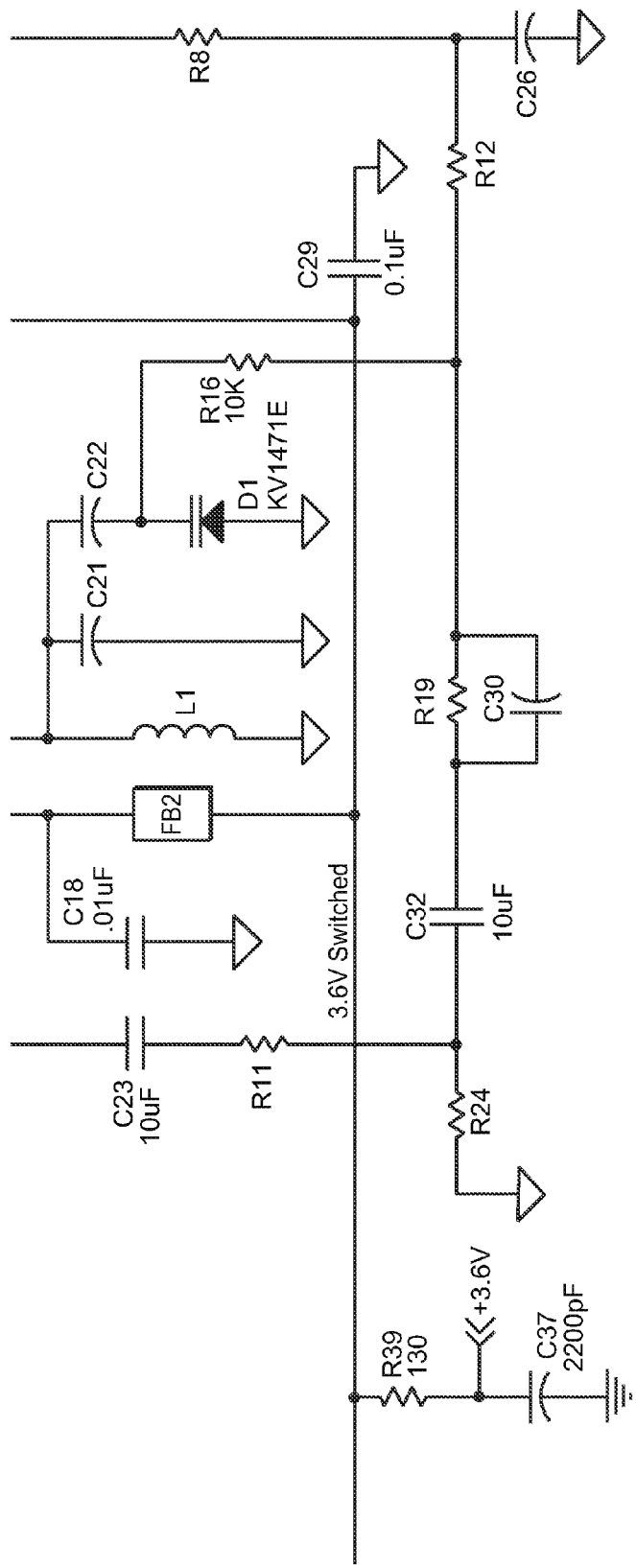
Figure 4D:
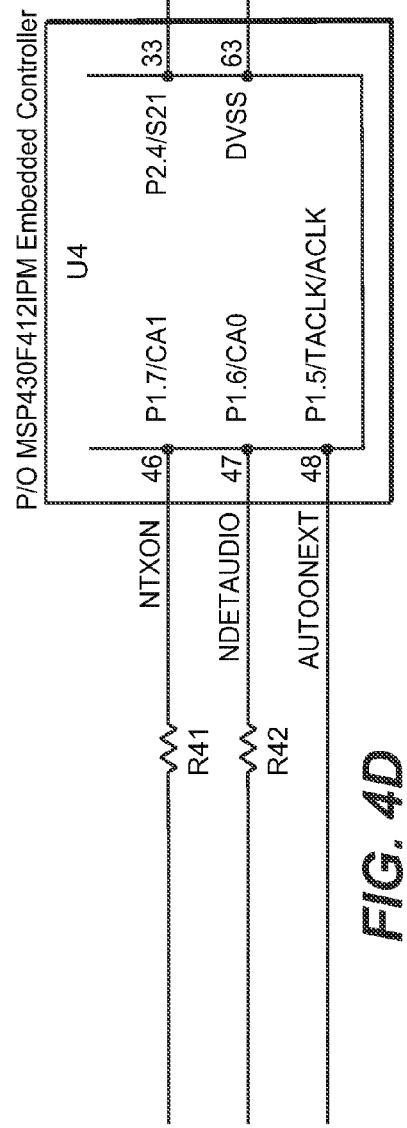
Figure 4D:
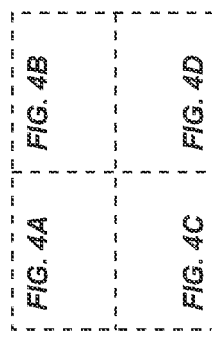
Figure 5A:
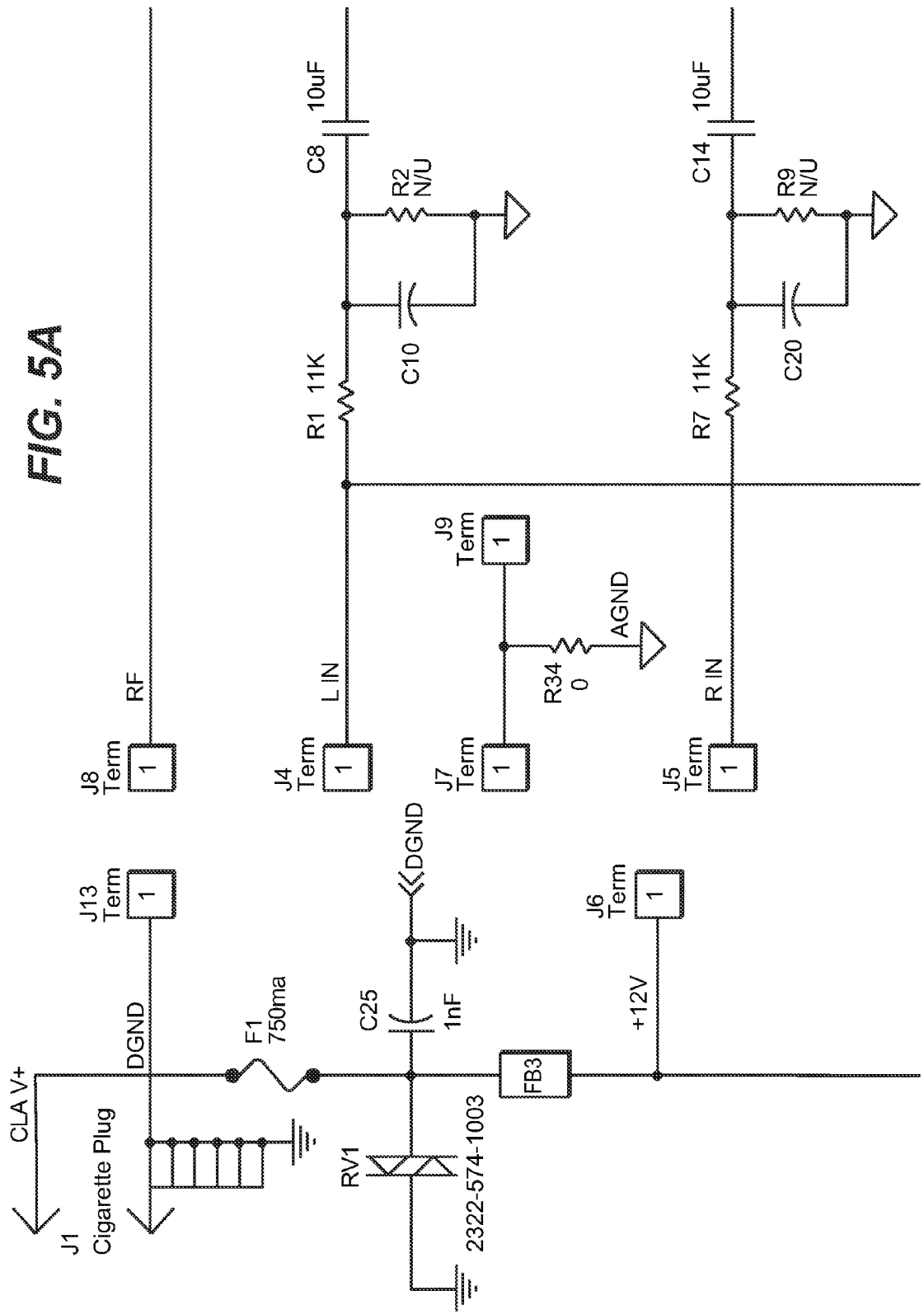
FIG. 5 (partitioned into FIGS. 5A-5D) is a circuit diagram of an alternative embodiment of the invention, wherein an embedded controller provides a timing function for the auto-off circuit, and detects the presence of audio.
Figure 5B:
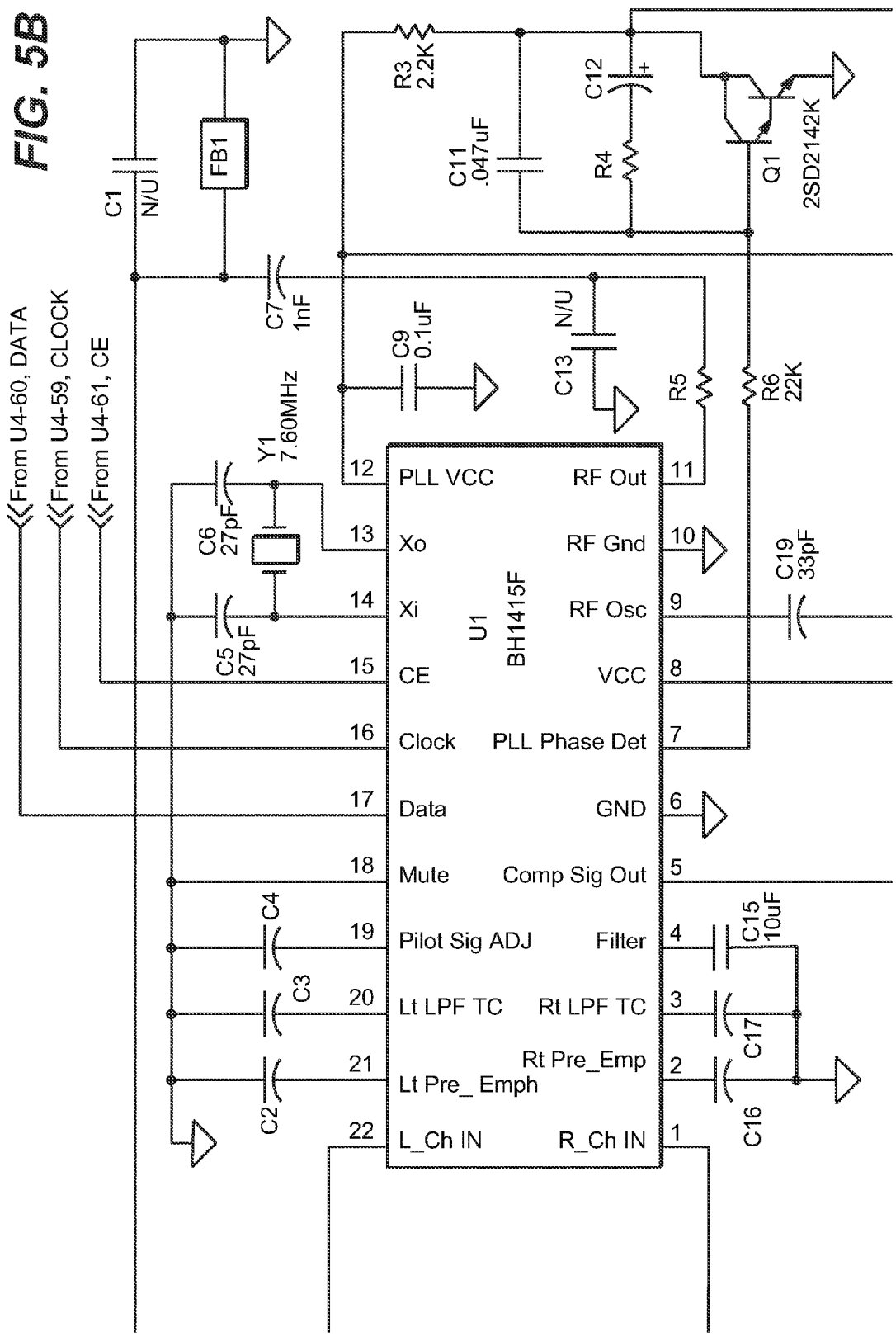
Figure 5C:
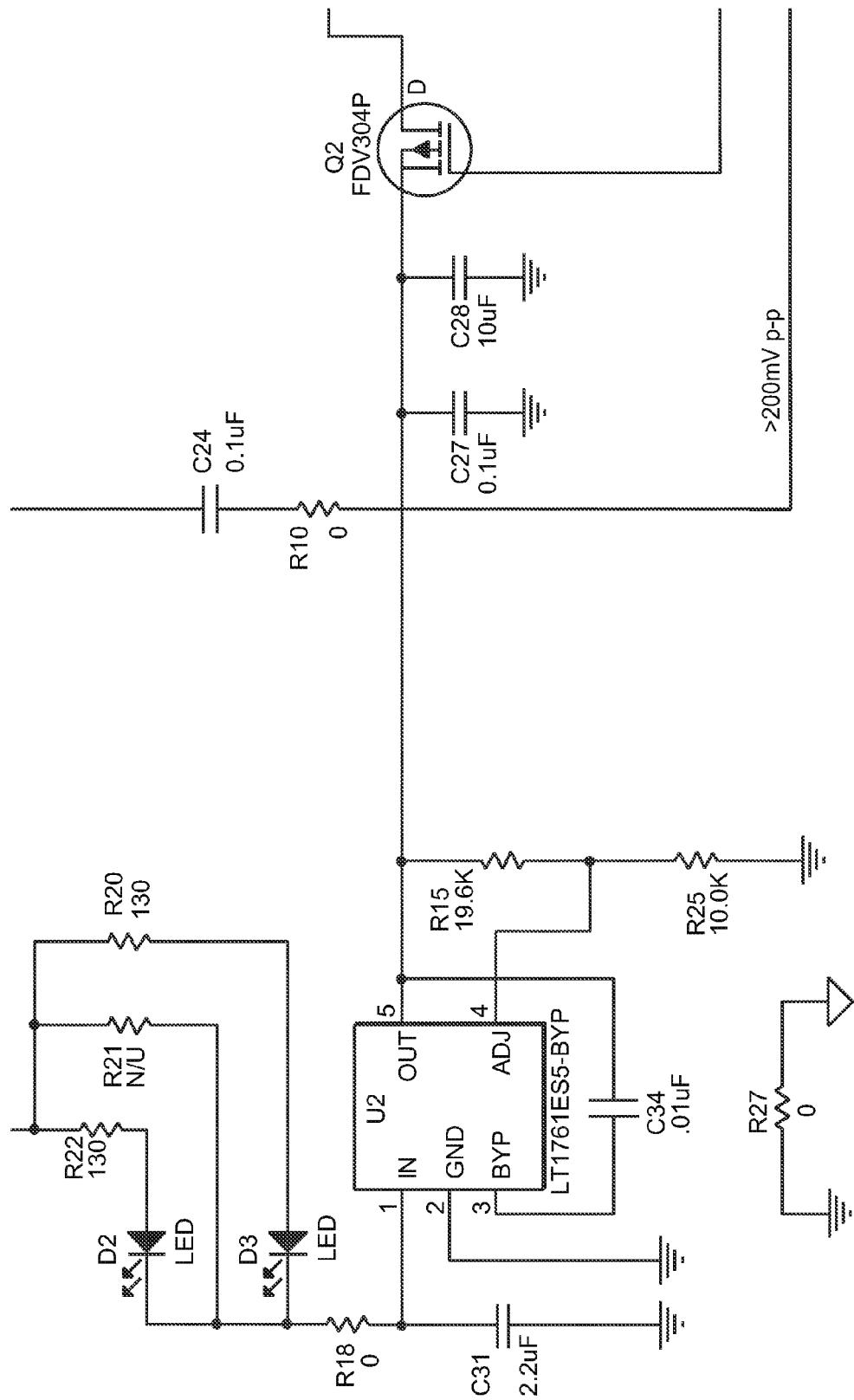
Figure 5D:
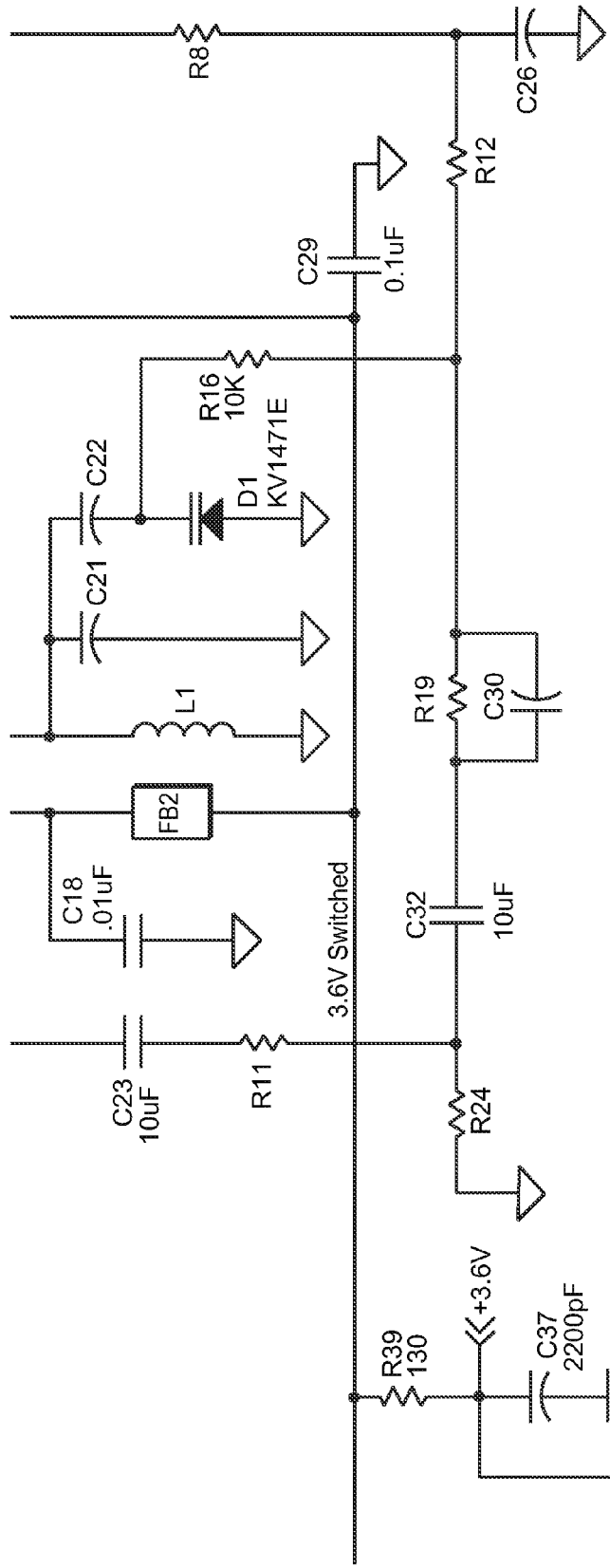
Figure 5D:
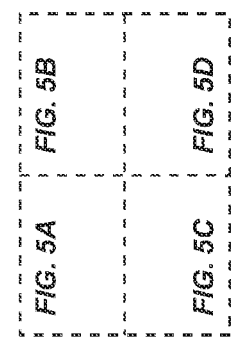

Referring now to FIG. 3, there is shown a circuit diagram of the auto-off feature as used in the preferred embodiment. Two important features of the disclosed circuit are effects of capacitance and "pinchoff." In the circuit as shown, where Q2 is a P-channel field effect transistor (MOSFET), as the drain voltage ($V_D$) within the circuit increases, so does the drain current ($I_D$), up to a certain level-off value. This is true as long as the gate voltage is constant and not too large. As the gate voltage continues to increase (positively, since this is a P-channel device) a depletion region begins to form in the channel. Charge carriers cannot flow in this region because they must pass through a narrowed channel. Ultimately, if the gate voltage becomes high enough, the depletion region will completely obstruct the flow of charge carriers, a phenomenon known as "pinch-off." Capacitance, on the other hand, impedes the flow of alternating current (AC) charge carriers by temporarily storing the energy as an electric field.

In the off mode, Q2 and Q3 are pinched off, with the capacitor labeled C29 charged to the battery voltage. Momentary contact switch SW2 discharges C29 when pressed, turning on Q2 which supplies power to the regulator. The output of the regulator turns on Q3 as it rises, enabling the audio sensing comparator output (PFO) to discharge C29, keeping Q2 on. The non-inverting input to the comparator is biased for a threshold of approximately six hundred (600) millivolts (mV). The inverting comparator input (PFI) is biased around six hundred fifty (650) mV and AC-coupled to the audio source. Whenever an audio peak (low) drops U2-2 (PFI) below its six hundred fourteen (614) mV threshold, U2-3 (PFO) goes low, discharging C29, which slowly accumulated a charge through R23. Should a sufficiently long period of time elapse without any audio pulses discharging C29 (about seventy seconds, for instance), it will approach the battery voltage, pinching off Q2. With the input supply cut off, the drop of the regulator output pinches off Q3, disabling the comparator (PFO) output from discharging C29 during regulator off conditions. In this mode, battery drain is about 3 microamperes. In a practical application of the circuit, the comparator polarity could be turned around, or reversed, such that it was sensing the positive going peaks to discharge the capacitor.

Referring next to FIG. 2C, an alternative embodiment of the auto-off circuit is shown. In the embodiment shown in FIG. 2C, 3V battery BT1 is connected to the source terminal of MOSFET Q2, and also provides power to pin 2 of comparator U3A, along with providing a bias voltage for the non-inverting input (pin 3) of comparator U3A. This bias is set by the values of resistors R25 and R21. The bias is set to cause comparator U3A output to go to the positive supply voltage when the inverting input (pin 4) of comparator U3A drops below the value of approximately 1 millivolt. Since resistor R28 pulls the inverting input (pin 4) to ground in the absence of an audio signal, until an audio signal is present, comparator U3A output (pin 1) is kept high, thereby charging capacitor C29 through resistor R27.

Battery BT1 also charges capacitor C29 through resistor R23. This occurs slowly due to the high value of resistor R3. When capacitor C29 is fully charged to the positive 3V supply voltage, the gate of MOSFET Q2 is pushed positive, and therefore the current through MOSFET Q2 is pinched off, blocking current to its drain terminal. This removes the supply current available to pin 1 of regulator chip U2 and removes operating power from the transmitter, thus shutting off the transmission of RF signals. This condition is true until audio is present (via resistor R13 or resistor R14 and capacitor C30) at the inverting input (pin 4) of comparator U3A.

When an audio signal arrives at the inverting input (pin 4) of comparator U3A, and when the audio signal rises above the 1 millivolt value, the output (pin 1) of comparator U3A goes to ground, thus rapidly discharging capacitor C29 through resistor R27. The value of R27 is very low, causing rapid discharge of capacitor C29. When capacitor C29 has discharged below a certain value, the current through MOSFET Q2 is switched all the way on, and the current is delivered to regulator chip U2, thus providing power to the transmitter circuitry (turning on the transmitter). As audio continues to arrive at the non-inverting input of comparator U3A, some of the audio negative peaks will reduce the voltage on the input to below 1 millivolt, thus triggering comparator U3A to push its output (pin 1) to near the positive supply voltage. This causes capacitor C29 to begin to charge through resistor R27. However, due to the large value of C29, C29 will not charge sufficiently to turn current through MOSFET Q2 off before the next positive half of an audio waveform arrives to rapidly discharge capacitor C29.

In this manner, the auto-off/on circuit shown in FIG. 2C provides the power-saving function of the present invention.

Referring now to FIG. 4, an additional alternative embodiment of the power-saving function of the present invention is shown. Note that the schematic includes, as its primary part, the transmitter circuits of a battery-powered transmitter. These circuits are typical of low-power low-current-drain transmitters current in the art. The power-saving circuitry of the present invention is seen in the power supply circuits, the components for which are found in the bottom third of the schematic drawing.

Still referring to FIG. 4, it can be seen that a direct-current power source (such as a 12V battery) provides power, via resistor R20 and then through light-emitting diode (LED) D3 and resistor R18, to the input (pin 1) of regulator chip U2. A parallel path is also used to provide, via resistor R22, LED D2 and resistor R18, current to the input (pin 1) of regulator chip U2. Capacitor C31 provides filtering of the input voltage. Capacitor C34 provides a bypass capacitance.

Regulator chip U2 is set (via the values of resistors R15 and R25) to regulate its output voltage to approximately +3.6V. Capacitors C27 and C28 provide filtering of the output voltage of regulator chip U2.

The output (pin 5) of regulator chip U2 provides source current to the source terminal of MOSFET Q2. The drain terminal of MOSFET Q2 provides the current source to all of the transmitter circuits.

The gate of MOSFET Q2 is connected to the NTXON (pin 46) output of embedded controller U4 via resistor R41. The gate of MOSFET Q2 is also connected to the positive terminal of capacitor C33. When capacitor C33 is charged to near the positive supply voltage, it causes MOSFET Q2 to pinch off current to its output drain terminal, thus turning off power to the transmitter circuits. Capacitor C33 slowly charges from the regulated +3.6V supply via resistor R14. Resistor R14 is very high to create a very long RC time constant with capacitor C33.

Still referring to FIG. 4, comparator U3 receives +3.6V power directly from the output of regulator chip U2. The non-inverting input (pin 3) of comparator U3 is biased to a value of approximately 1 millivolt through the values of resistors R13 and R23. The inverting input (pin 4) of comparator U3 receives an audio input via capacitor C24 and resistor R10. The inverting input (pin 4) of comparator U3 also receives the voltage provided by the AUOTONEXT output (pin 48) of embedded controller U4 via resistor R10.

In the case where the voltage provided by the AUOTON-EXT output (pin 48) of embedded controller U4 via resistor R10 is greater than the bias value of comparator U3, the output (pin 1) of comparator U3 is pulled to near ground, thereby rapidly discharging capacitor C33 through R17, thus causing MOSFET Q2 to allow current flow to its output drain terminal. This causes the transmitter circuits to turn on (or remain on).

In the case where the AUOTONEXT output (pin 48) of embedded controller U4 is floated (neither pushed high, nor pulled low, but providing a very high input resistance), the actions of comparator U3 are dependent on the presence or absence of audio signal at the inverting input (pin 4) of comparator U3.

When audio is present on the inverting input (pin 4) of comparator U3, the output (pin 1) of comparator U3 is pushed to near ground, thus rapidly discharging capacitor C33 via resistor R17. This causes MOSFET Q2 to allow current flow to its output drain terminal. This causes the transmitter circuits to turn on (or remain on).

When comparator output (pin 1) is pulled to near ground, the NDETAUDIO input (pin 47) of embedded controller U4 is pulled to near ground through resistor R42. When this occurs, firmware in embedded controller U4 detects and records the event. Once such an event is recorded, the firmware in embedded controller U4 watches for the event where the NDETAUDIO input (pin 47) of embedded controller U4 is pushed above a voltage threshold through resistor R42. This voltage threshold is less than the positive voltage required to cause MOSFET Q2 to pass current. When this second event is detected, the NTXON output (pin 46) of embedded controller U4 is pulled low (near to ground), rapidly draining capacitor C33 through resistor R17, thereby keeping the gate of MOSFET Q2 low and thus keeping power supplied to the transmitter circuits.

This condition is maintained while a positive voltage is provided at the AUTOONEXT output (pin 48) of embedded controller U4. This positive voltage is fed, via resistor R10 to the inverting (pin 4) input of comparator U3. This immediately forces the output (pin 1) of comparator U3 to near ground, thus rapidly discharging capacitor C33, via resistor R17. This condition causes MOSFET Q2 to continue to provide power to the transmitter circuits. Once the positive voltage is provided at the AUTOONEXT output (pin 48) of embedded controller U4, embedded controller U4 floats its NTXON output, and starts an internal timer that measures the amount of time elapsed since the absence of audio was detected. If a predetermined amount of time has elapsed (70 seconds, for example), the AUTOONEXT output (pin 48) of embedded controller U4 is floated, so if no audio is then present, the inverting input (pin 4) of comparator U3 is pulled to ground potential through resistor R28. When this occurs, the output (pin 1) of comparator U3 is again pushed to near the supply voltage, charging capacitor C33 through resistor R17, thus causing MOSFET Q2 to pinch off the current to its output drain terminal (turning off the transmitter circuits). When this happens, the NDETAUDIO input (pin 47) of embedded controller U4 is pulled to near ground through resistor R42. When embedded controller U4 detects this event, it resets and waits to detect the condition where audio is once again present.

If audio is present when the internal timer of embedded controller U4 reaches its predetermined time limit, when the AUTOONEXT output (pin 48) of embedded controller U4 is floated, the inverting input of comparator U3 detects the audio, thereby continuing to hold its output (pin 1) near ground potential, keeping capacitor C33 discharged, thus causing the gate of MOSFET Q2 to remain low and allow current to flow to its output drain terminal. This keeps power supplied to the transmitter circuits. In this condition, embedded controller U4 detects that its NDETAUDIO input (pin 47) was never pulled high after the AUTOONEXT output (pin 48) of embedded controller U4 was floated. This condition causes the firmware in embedded controller U4 to begin watching once again for the absence of audio.

By this description it can be seen that the embodiment of the invention shown in FIG. 4 provides the power-saving function of the present invention by keeping power turned off to the transmitter circuits until audio is present from an audio source. When audio is present, the transmitter circuits are turned on, and when the audio disappears, after a predetermined delay, the transmitter circuits are automatically turned off to save battery power and prevent unnecessary RF transmissions.

Now referring to FIG. 5, another alternative embodiment of the power-saving function of the present invention is shown in a schematic form. Note that the schematic includes, as its large part, the transmitter circuits of a battery-powered transmitter. These circuits are typical of low-power low-current-drain transmitters current in the art. The power-saving circuitry of the present invention is seen in the power supply circuits whose components can be seen in the bottom third of the schematic drawing.

Still referring to FIG. 5, it can be seen that a direct-current power source (such as a 12V battery) provides power, via resistor R20 and then through light-emitting diode (LED) D3 and resistor R18, to the input (pin 1) of regulator chip U2. A parallel path is also used to provide, via resistor R22, LED D2 and resistor R18, current to the input (pin 1) of regulator chip U2. Capacitor C31 provides filtering of the input voltage. Capacitor C34 provides a bypass capacitance.

Regulator chip U2 is set (via the values of resistors R15 and R25) to regulate its output voltage to approximately +3.6V. Capacitors C27 and C28 provide filtering of the output voltage of regulator chip U2.

The output (pin 5) of regulator chip U2 provides source current to the source terminal of MOSFET Q2. The drain terminal of MOSFET Q2 provides the current source to all of the transmitter circuits.

The gate of MOSFET Q2 is connected to the NTXON (pin 46) output of embedded controller U4 via resistor R41. When the output on pin 46 of embedded controller U4 is pushed high (near to the positive supply voltage), it causes MOSFET Q2 to pinch off current to its drain terminal, thereby turning off power to the transmitter circuits and halting the transmission of RF signals. When the output on pin 46 of embedded controller U4 is pulled low (near to ground), it causes MOSFET Q2 to allow current to flow to its drain terminal, thereby turning on power to the transmitter circuits and starting the transmission of RF signals.

The NDETAUDIO input (pin 47) of embedded controller U4 is a comparator input that detects the presence of an audio signal arriving via capacitor C24 and resistor R10. Pin 47 of embedded controller U4 is biased at +1.3V by the values of resistors R13 and R23.

When audio is present on pin 47 of embedded controller U4, its internal comparator output indicates so, thereby causing internal firmware to pull NTXON (pin 46) of embedded controller U4 to near ground. When this occurs, the gate of MOSFET Q2 is pulled low, allowing current to flow to its drain terminal, thereby turning on the transmitter circuits.

When audio is no longer detected as present on the NDETAUDIO input (pin 47) of embedded controller U4, embedded controller U4 starts an internal timer, measuring the duration of the absence of audio on the input pin. If the internal timer reaches a predetermined duration (70 seconds, for example), embedded controller U4 pushes its NTXON output (pin 46) to near the positive supply voltage. This results in the gate of MOSFET Q2 being pushed high, pinching off the current flow to its drain terminal, thus turning off the transmitter circuits. If audio reappears on the NDETAUDIO input (pin 47) of embedded controller U4 before its internal time reaches a predetermined duration, the timer is deactivated, and the NTXON output (pin 46) of embedded controller U4 remains pulled to near ground, thus leaving MOSFET Q2 in the mode of providing current to the transmitter circuits.

By this description it can be seen that the embodiment of the invention shown in FIG. 5 provides the power-saving function of the present invention by keeping power turned off to the transmitter circuits until audio is present from an audio source. When audio is present, the transmitter circuits are turned on, and when the audio disappears, after a predetermined delay, the transmitter circuits are automatically turned off to save battery power and prevent unnecessary RF transmissions.

Thus, it will be appreciated, that in its most essential form, the power-saving auto-off circuit of the present invention comprises the following elements: (1) a battery to provide power to a voltage regulator; (2) a voltage regulator powered by the battery and providing a regulated voltage output; (3) a current-switching means having as its power input the output of the voltage regulator; (4) a timing circuit having a reset state and a non-reset state and held initially in a non-reset state, and having an output in communication with a controlling input of the current-switching means, such that when the timing circuit is in a non-reset state it switches the current-switching means to an off state at the end of a predetermined amount of time unless the timing circuit is reset, and when the timing circuit is in a reset state it switches the current-switching means to an on state and allows current to flow through the current-switching means to the transmitter; and (5) a baseband signal detection circuit for detecting the presence of the baseband signal and having an input in communication the source of the baseband signal and an output in communication with a controlling input of the timing circuit, and when the baseband signal detection circuit detects the presence of the baseband signal it resets the timing circuit, causing the current-switching means to transition to an on state, thus providing power to the transmitter, and thereafter continues to keep the timing circuit in a reset state while the presence of the baseband signal is detected, and when said baseband signal detection circuit no longer detects the baseband signal, the timing circuit waits up to the predetermined amount of time before switching the current-switching means to an off state, thus cutting off power to the transmitter.

While certain embodiments have been described above in terms of the system within which utilization may occur and/or reside, the invention is not limited to such context. The system shown in FIG. 1 is an example of a host system of the invention, and the system elements are intended merely to exemplify the type of peripherals and components that can be used in support of the invention.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A power-saving auto-off circuit for a wireless transmitter modulated by a baseband signal, said auto-off circuit comprising:
   a battery;
   a voltage regulator powered by said battery for providing a regulated voltage output;
   current-switching means receiving as its input the output of said voltage regulator and having a controlling input;
   a timing circuit having a reset state and a non-reset state and held initially in a non-reset state, said timing circuit having an output in communication with said controlling input of said current-switching means, wherein when said timing circuit is in a non-reset state it switches said current-switching means to an off state at the end of a predetermined amount of time unless said timing circuit is reset, and wherein when said timing circuit is in a reset state it switches said current-switching means to an on state and allows current to flow through said current-switching means to the transmitter;
   a baseband signal detection circuit for detecting the presence of the baseband signal and having an input in communication the source of the baseband signal and an output in communication with a controlling input of said timing circuit, wherein when said baseband signal detection circuit detects the presence of the baseband signal it resets said timing circuit, causing said current-switching means to transition to an on state, thus providing power to said transmitter, and continues to keep said timing circuit in a reset state while the presence of the baseband signal is detected, and wherein when said baseband signal detection circuit no longer detects the baseband signal, said timing circuit waits for the predetermined amount of time before switching said current-switching means to an off state, thus cutting off power to the transmitter.

2. The power-saving auto-off circuit of claim 1, wherein said current-switching means is a field-effect transistor.

3. The power-saving auto-off circuit of claim 1, wherein said current-switching means is a bipolar transistor.

4. The power-saving auto-off circuit of claim 1, wherein said timing means is a capacitor in communication with a resistor, and wherein the predetermined amount of time is the time required for said capacitor to discharge from a fully charged state through said resistor, and wherein said baseband detection circuit rapidly discharging said capacitor when said baseband detection circuit detects the presence of said baseband signal, and said baseband signal detection circuit allowing said capacitor to at least partially charge when said baseband signal is not detected.

5. The power-saving auto-off circuit of claim 4, wherein said baseband detection circuit is a voltage comparator with a comparing input in communication with the source of said baseband signal, said voltage comparator being biased such that, when said baseband signal is present at said comparing input of said comparator, the output of said comparator rapidly discharges said capacitor, and wherein said voltage comparator, when said baseband signal is not present at said comparing input of said voltage comparator, allows said capacitor to charge via said resistor.

6. The power-saving auto-off circuit of claim 1, wherein said timing means is a logical controller having an input in communication with an output of said baseband detection circuit and an output in communication with said controlling input of said timing circuit, wherein upon receiving a signal from said baseband detection circuit indicating that the presence of said baseband signal is detected, said logical controller switches said current-switching means to an on state, and wherein said logical controller upon receiving a signal from said baseband detection circuit indicating that the presence of said baseband signal is no longer detected, waits said predetermined amount of time before switching said current-switching means to an off state.

7. A power-saving auto-off circuit for a wireless transmitter modulated by a baseband signal, said auto-off circuit comprising:

a battery;

a current-switching means powered by said battery and having an output;

a voltage regulator having as a power input said output of said current-switching means and having an integrated internal voltage comparator circuit and a logical output, said voltage regulator receiving power through said power input only when said current-switching means is in an on state and current flows through said current-switching means to said power input of said voltage regulator, and providing as its output a regulated voltage for providing power to the transmitter;

a controlling input for said current-switching means;

a timing circuit having a reset state and held in an initial non-rest state and having an output in communication with said controlling input of said current-switching means, and having a controlling input in communication with said logical output of said voltage regulator, wherein when said timing circuit is in a non-reset state it switches said current-switching means to an off state at the end of a predetermined amount of time unless said timing circuit is reset, and wherein when said timing circuit is in a reset state it switches said current-switching means to an on state; and a baseband signal detection circuit for detecting the presence of the baseband signal, said baseband detection circuit having an input in communication the source of the baseband signal, said baseband detection circuit comprising said voltage comparator integrated into said voltage regulator, said voltage comparator being biased to detect the presence of the baseband signals, wherein said voltage comparator has an output in communication with said logical output of said voltage regulator, and wherein said voltage comparator, upon detection of the presence of said baseband signal, causes said logical output of said voltage regulator to reset said timing circuit, thereby causing said current-switching means to transition to an on state, thus providing power to said transmitter, said voltage comparator, via said logical output, continuing to keep said timing circuit in a reset state while the presence of said baseband signal is detected;

wherein said timing circuit no longer detects a baseband signal waits up to said predetermined amount of time before switching said current-switching means to an off state, thus removing power from said transmitter.

8. The power-saving auto-off circuit of claim 7, wherein said logical output of said voltage regulator is in communication with said timer circuit via said control-switching means, and said control-switching means blocks resetting of said timer circuit until said control-switching means is activated by the presence of an operating voltage at the output of said voltage regulator.

9. The power-saving auto-off circuit of claim 7, wherein said control-switching means is selected from the group consisting of field-effect transistors and bipolar transistors.

10. The power-saving auto-off circuit of claim 7 wherein said timing means is a capacitor in communication with a resistor, said predetermined amount of time being the time required for said capacitor to discharge from a fully charged state through said resistor, said logical output of said voltage regulator rapidly discharging said capacitor when said voltage regulator detects the presence of said baseband signal, and said logical output of said voltage regulator allowing said capacitor to at least partially charge when the baseband signal is not detected by said voltage regulator.

* * * * *